US011163428B1

(12) United States Patent
Mansour et al.

(10) Patent No.: US 11,163,428 B1
(45) Date of Patent: Nov. 2, 2021

(54) DISPLAYING A HOVER GRAPHIC WITH A DYNAMIC TIME DELAY

(71) Applicant: MICROSOFT TECHNOLOGY LICENSING, LLC, Redmond, WA (US)

(72) Inventors: Mohamed Mansour, Kirkland, WA (US); Federico Paredes Garza, Bellevue, WA (US); Mathew Paul Siembor, Bellevue, WA (US); Felix Andrew, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/902,083

(22) Filed: Jun. 15, 2020

(51) Int. Cl.
*G06F 3/00* (2006.01)
*G06F 3/0484* (2013.01)
*G06F 3/0481* (2013.01)

(52) U.S. Cl.
CPC .......... *G06F 3/0484* (2013.01); *G06F 3/0481* (2013.01)

(58) Field of Classification Search
CPC .............................. G06F 3/0484; G06F 3/0481
See application file for complete search history.

(56) References Cited

U.S. PATENT DOCUMENTS

| 5,870,079 | A | * | 2/1999 | Hennessy | ........... | G06F 3/04812 |
| | | | | | | 345/157 |
| 5,995,101 | A | * | 11/1999 | Clark | ................... | G06F 3/04895 |
| | | | | | | 715/711 |
| 6,281,879 | B1 | * | 8/2001 | Graham | ............... | G06F 3/04812 |
| | | | | | | 345/157 |
| 6,362,842 | B1 | * | 3/2002 | Tahara | ................ | G06F 3/04812 |
| | | | | | | 715/705 |
| 6,583,781 | B1 | | 6/2003 | Joshi et al. | | |
| 10,318,034 | B1 | * | 6/2019 | Hauenstein | ......... | G06F 3/04842 |
| 2004/0205514 | A1 | * | 10/2004 | Sommerer | ............ | G06F 40/137 |
| | | | | | | 715/205 |
| 2012/0017182 | A1 | * | 1/2012 | Bau | ...................... | G06F 3/04812 |
| | | | | | | 715/859 |
| 2013/0191768 | A1 | * | 7/2013 | Thompson | ............ | G06F 3/0481 |
| | | | | | | 715/765 |
| 2014/0152623 | A1 | * | 6/2014 | Lee | ..................... | G06F 3/03545 |
| | | | | | | 345/175 |

(Continued)

OTHER PUBLICATIONS

"International Search Report and Written Opinion issued in PCT Application No. PCT/US21/026079", dated Jul. 23, 2021, 11 Pages.

*Primary Examiner* — Kieu D Vu
*Assistant Examiner* — Andrew Chung

(57) ABSTRACT

A device is disclosed, which includes a processor and a memory in communication with the processor. The memory includes executable instructions that, when executed by the processor, cause the processor to control the device to perform functions of providing a graphical user interface for a user on a display; displaying a user interface component on the graphical user interface; providing a pointer on the graphical user interface controlled by the user to interact with the user interface component on the graphical user interface; in response to the pointer being positioned over the displayed user interface component, and displaying after a dynamic hover trigger delay a hover graphic proximate to the component wherein the dynamic hover trigger delay dynamically changes depending on movement of the pointer by the user.

16 Claims, 8 Drawing Sheets

(56) References Cited

U.S. PATENT DOCUMENTS

| | | | |
|---|---|---|---|
| 2015/0169170 A1* | 6/2015 | Beach | G06F 3/04812 715/856 |
| 2015/0301719 A1* | 10/2015 | Shinde | G06F 3/04842 715/808 |
| 2018/0046352 A1* | 2/2018 | Johnson | G06F 3/04812 |

* cited by examiner

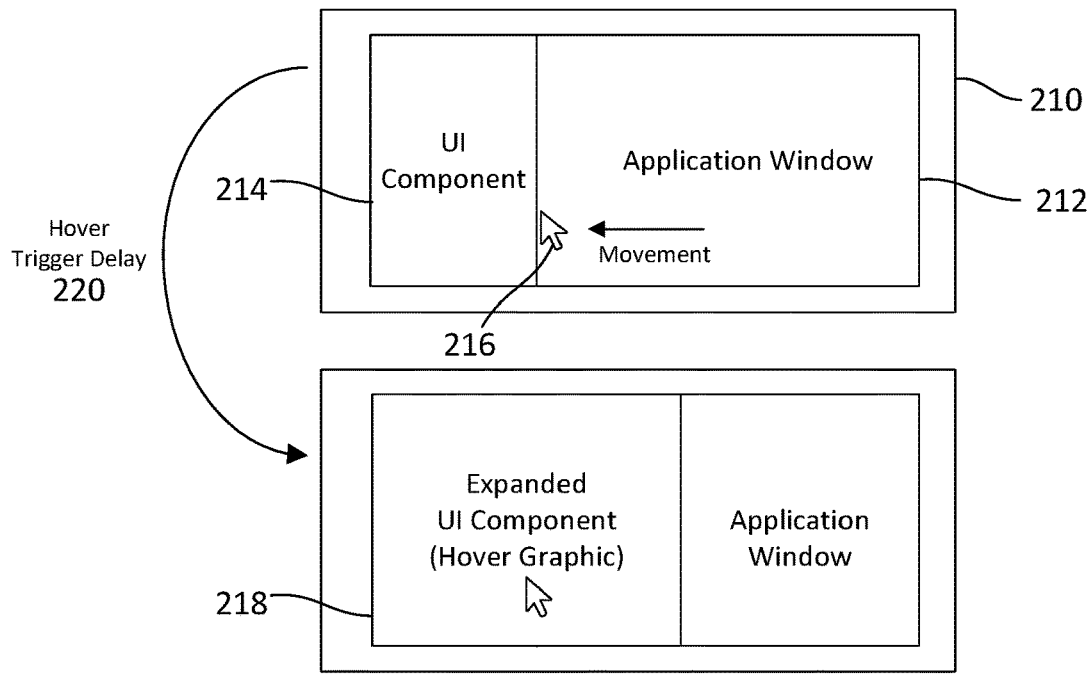
FIG. 2
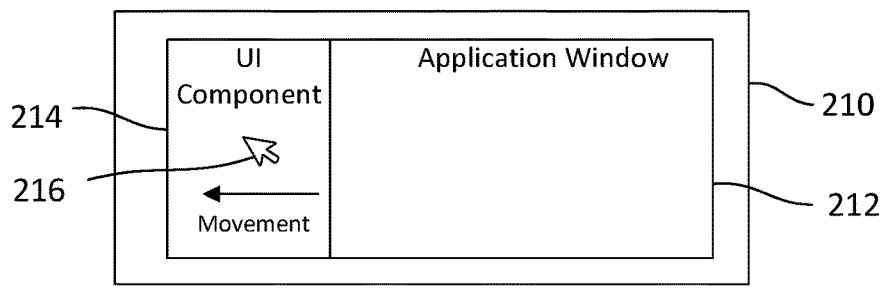
FIG. 3A
| Ex. | Acceleration Based Delay | Modify Hover Trigger Delay |
|---|---|---|
| 1 | Pointer Moves Within UI Component at Constant Velocity | Maintain Initial Delay (1000ms) Stutter = 10% |
| 2 | Pointer Movement Deaccelerates | Decrease to Minimum (1ms) Stutter = 2pixels |
| 3 | Pointer Movement Accelerates | Increase to Maximum (1000ms) Stutter = 2pixels |
FIG. 3B

DISPLAYING A HOVER GRAPHIC WITH A DYNAMIC TIME DELAY

BACKGROUND

Computers use very sophisticated graphical user interfaces to facilitate input and control from a user. The graphical user interface may have a variety of user interface components that a user can select or manipulate. These components may include graphics, buttons, data display boxes, data input boxes, etc. A common feature of a computer graphical user interface is to display an additional graphic when a pointer device controlled by the user moves over a user interface component. The displayed graphic is sometimes called a "hover graphic" where it is displayed when the pointer "hovers" over the related user interface component. Similarly a user interface component may expand in size when the pointer hovers over the interface component. The hover graphic or expandable interface component typically gives added information about the user interface component, brings up a sub-menu or brings up commands related to the interface component beneath the pointer. There may be a time delay before the hover graphic is displayed. This time delay is referred to herein as the hover trigger delay. The hover trigger delay begins when the pointer hovers over the user interface component. At the end of the hover trigger delay the user interface displays the hover graphic.

SUMMARY

A device is disclosed, which includes a processor and a memory in communication with the processor. The memory includes executable instructions that, when executed by the processor, cause the processor to control the device to perform functions of providing a graphical user interface for a user on a display; displaying a user interface component on the graphical user interface; providing a pointer on the graphical user interface controlled by the user to interact with the user interface component on the graphical user interface; and in response to the pointer being positioned over the displayed user interface component, displaying after a dynamic hover trigger delay a hover graphic proximate to the component wherein the dynamic hover trigger delay dynamically changes depending on movement of the pointer by the user.

In another implementation, a method of operating a device is disclosed, which includes providing a graphical user interface for a user on a display; displaying a user interface component on the graphical user interface; providing a pointer on the graphical user interface controlled by the user to interact with the user interface component on the graphical user interface; and in response to the pointer being in proximity to the displayed user interface component, displaying after a dynamic hover trigger delay a hover graphic proximate to the component wherein the dynamic hover trigger delay dynamically changes depending on movement of the pointer by the user.

In another implementation, a non-transitory computer readable medium is disclosed on which are stored instructions that, when executed by a computer processor, cause a device to: provide a graphical user interface for a user on a display; display a user interface component on the graphical user interface; provide a pointer on the graphical user interface controlled by the user to interact with the user interface component on the graphical user interface; and in response to the pointer being in proximity to the displayed user interface component, display after a dynamic hover trigger delay a hover graphic proximate to the component wherein the dynamic hover trigger delay dynamically changes depending on movement of the pointer by the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 illustrates a generic view of a graphical user interface with an application and a user interface component that expands with a hover graphic after a hover trigger delay.

FIG. 3A illustrates acceleration and movement of a pointer over a user interface component that invokes a change in the dynamic hover trigger delay.

FIG. 3B illustrates an implementation of a dynamic hover trigger delay depending on acceleration of the pointer.

DETAILED DESCRIPTION

Figure 1:
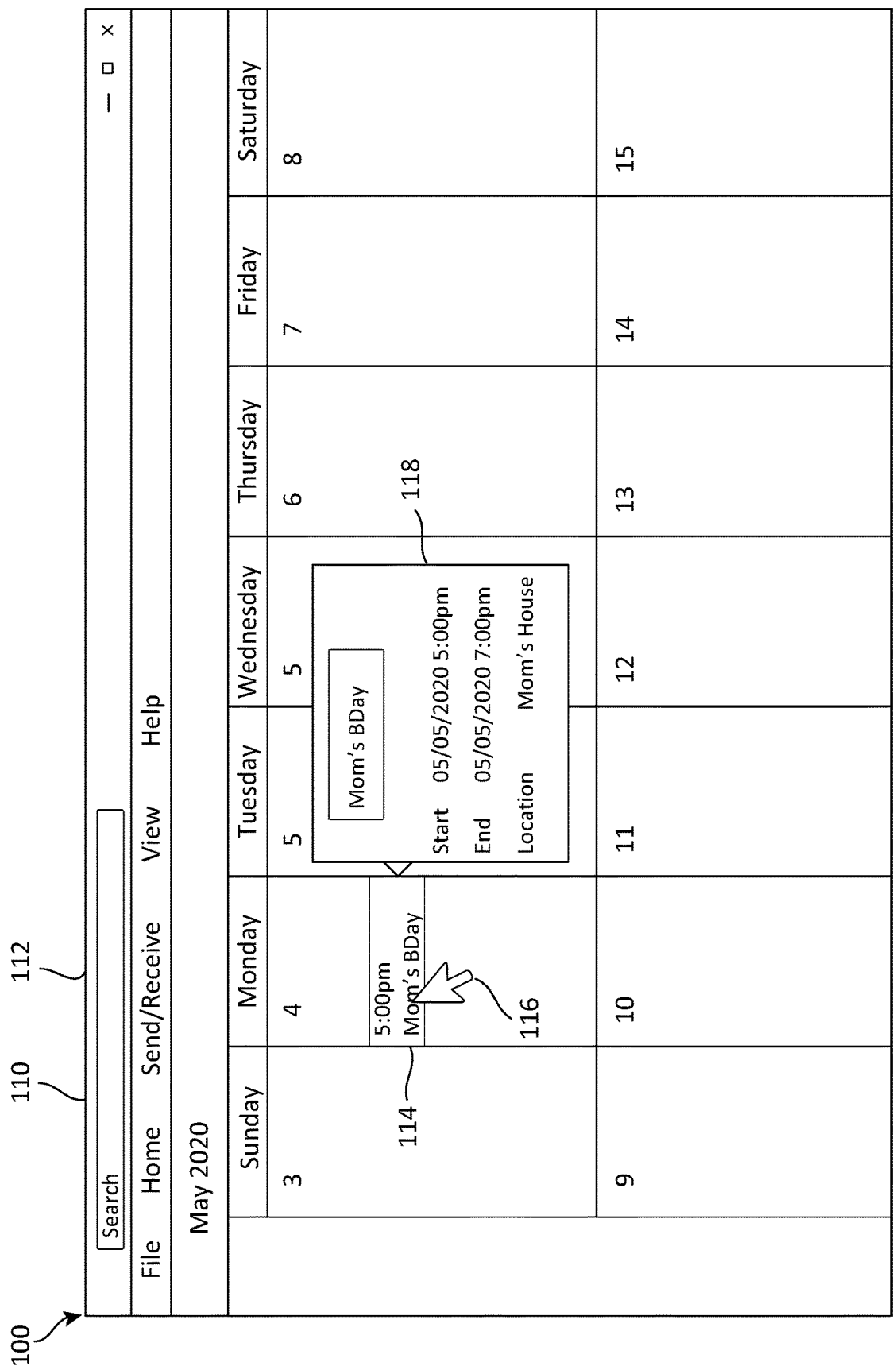
FIG. 1 illustrates an implementation of a graphical user interface for a calendar application with a hover graphic.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to a system and method for displaying a hover graphic on a graphical user interface with a dynamic delay. A hover graphic is a common feature of a computer user interface. The hover graphic is displayed when a pointer device controlled by a user moves over or "hovers" over a user interface component. As used herein, the term hover graphic also includes a user interface component that expands in size when the pointer hovers over the interface component. In the prior art there is typically a fixed time delay before the hover graphic is displayed after the pointer hovers over the user interface component associated with the hover graphic. The time delay is referred to herein as the hover trigger delay. As used herein, the term pointer may include a cursor or other GUI artifact controlled by a mouse, a keyboard, or a touch pad. Or the pointer may be implemented as a contact point on a touch screen. Alternatively, the pointer may be implemented by other non-touch means such as by gaze or voice in which a user interacts with a computer user interface on a display, including by not limited to, two dimensional displays, three dimensional displays as well as virtual reality and mixed reality displays.

There are problems that can arise when using a fixed time delay for displaying a hover graphic. If the hover trigger delay is too short, it can result in the hover graphic being triggered for display too often. Displaying the hover graphic too quickly and too often can be annoying and distracting to the user. For example, hover graphics could pop up while a user casually moved the pointer over the user interface but not intending to select a user interface component. This may be referred to as accidental overshoots of the hover graphic display. Conversely, if the hover trigger delay is too long it could also detract from the user experience. If the hover trigger delay is too long the user may not realize there is a hover graphic. Other problems arise when people with disabilities use the graphical user interface. Someone with disabilities may have difficulty maintaining the pointer over the interface component. If a person with disabilities moves the pointer near the edge of the interface component the hover graphic may not be stable due to a shaking hand holding the pointer device. While smoothing techniques applied to the mouse or pointer movement may help, these smoothing techniques may not be sufficient for providing a stable and effective hover graphic.

To address some of the above problems and limitations, the description herein provides a system and method for a hover graphic on a graphical user interface with a dynamic hover trigger delay wherein the dynamic hover trigger delay dynamically changes depending on movement of the pointer by the user after the pointer hovers over the user interface component. As used herein, the pointer hovers over the user interface component when the pointer comes into virtual contact with the user interface component. Some implementations of the dynamic hover trigger delay as described herein have two components that together can make up the total hover trigger delay. The first component is related to movement of the pointer and is called herein acceleration based delay. The second component of the dynamic hover trigger delay is a location component referred to herein as proximity based delay. In some implementations, one or the other, or both of these components may be used to dynamically adjust the hover trigger delay. The dynamic hover trigger delay provides an increased delay for some situations and a decreased delay for other situations. When the pointer hovers over a display component a countdown can be started for the dynamic trigger delay. When an action or situation indicates a change, the hover trigger delay is updated or changed and the countdown can then be resumed with the updated time. The dynamic hover trigger delay can decrease the number of unwanted overshoots, provide quick display of hover graphic when appropriate, and smooth the response for the disabled to improve the overall user experience.

Attention is now turned to the figures to describe various implementations of the presented teachings. FIG. 1 illustrates an example of a computer display 100 of a computer system upon which aspects of this disclosure may be implemented. Further the display 100 may be part of the computer system illustrated in FIG. 8 such as display 812. The display 100 provides a graphical user interface (GUI) 110 for a calendar application 112 executing on the computer system. In the illustrated example implementation, the GUI 110 includes a partial month view of a calendar. On the calendar day of Monday the $4^{th}$, there is a calendar event block 114 that indicates an event at 5:00 PM. The name of the event is shown in the event block 114 as "Mom's BDay". The event block 114 is normally all the information that is visible when the pointer of the GUI is not over the event block 114. When the user moves the pointer 116 over the event block 114, and after a dynamic hover trigger delay, then the hover graphic 118 is displayed to the user. In this example, the hover graphic 118 includes additional information for the event block 114. The additional information includes a full description of the start time, end time and location of the event represented in the event block. When the user moves the pointer outside the confines of the event block 114, the hover graphic 118 will be removed from view. In the description herein, the event block 114 is referred to generally as a user interface component.

FIG. 2 illustrates a generic view of a graphical user interface 210 with an application window 212 and a generic user interface component 214. The graphical user interface 210 may be displayed on a computer display such as display 812 of the computer system illustrated in FIG. 8. The user interface component 214 in this example is typically a side bar or menu that partially displays options for the user in to use in the application window 212. When movement of a pointer 216 brings the pointer 216 into a position over the user interface component 214, the user interface component becomes an expanded user interface component 218 as shown in the lower portion of the drawing indicating the changed view of the user interface after a dynamic hover trigger delay 220. The expanded user interface component 218 will typically display additional features or options to the user. The expanded user interface component 218 is referred herein generally to be a hover graphic when in the expanded form. While the expanded user interface component is a slightly different style of hover graphic, they have the same problems and limitations of the hover graphic type shown in FIG. 1. The dynamic hover trigger delay described herein applies equally to both types of hover graphics.

FIG. 3A illustrates a representation of a generic graphical user interface 210 with an application window 212 and a user interface component 214 to introduce implementations of a dynamic hover trigger delay depending on movement of the pointer 216. The user interface component 214 is similar to the user interface component in FIG. 2 and described above. FIG. 3A illustrates acceleration and movement of a pointer 216 over the user interface component 214 that invokes a dynamic change in the hover trigger delay. When movement of a pointer 216 brings the pointer into a position over the user interface component 214, the user interface component becomes an expanded user interface component 218 or hover graphic after a dynamic hover trigger delay as described above. However, FIG. 3A represents a point in time after the pointer 216 moves into a position or hovers over the user interface component 214 but before the hover graphic is displayed at the end of the hover trigger delay. At this point in time, movement of the pointer continues to affect the hover trigger delay until the hover graphic is displayed. The movement component of the hover trigger display is called acceleration based delay. If the user continues to move the pointer after moving the pointer over the user interface component, the hover trigger delay may be changed depending on whether the movement is a constant velocity, deaccelerating or accelerating. In specific implementations, generally acceleration and constant velocity movement of the pointer correspond to higher hover trigger delay because it demonstrates the intent of the user is to pass over the user interface component. In contrast, deacceleration generally corresponds to a lower hover trigger delay because it may demonstrate the user's intent to stay over the user interface component.

FIG. 3B illustrates examples of a dynamic hover trigger delay depending on acceleration of the pointer. The dynamic hover trigger may include an acceleration based delay component that affects when the hover graphic will be displayed depending on whether the movement is a constant velocity, deaccelerating or accelerating. The hover trigger delay may be set to an initial value when the pointer moves into a position or hovers over the user interface component. The acceleration based delay may change the initial hover trigger delay as shown in the following examples. In the first example, when the pointer moves within the user interface component at a constant velocity the hover trigger delay is given a higher value, or maintained at an initial value such as 1000 ms. In the second example, if the pointer movement deaccelerates while over the user interface component, the hover trigger delay is set to a smaller delay such as 1 ms. In the third example, if the pointer movement accelerates the hover trigger delay is set to a higher delay such as 1000 ms. For example, if the hover trigger delay was initially 1000 ms but 500 ms had elapsed and the pointer began to accelerate, the hover trigger delay could be increased up to 1000 ms.

In the examples shown in FIG. 3B, the hover trigger delay based on acceleration may also include a smoothing component called a stutter threshold. The stutter threshold may be introduced to increase smoothing for unintentional pointer movement such as that caused by shaking hands. In example 1, the hover trigger delay is set at 1000 ms for a constant velocity of the pointer 216. The stutter provides a range or threshold in the change of velocity to be considered "constant". In this example, the stutter threshold is represented as a percentage of the velocity. So the velocity would be considered constant if it doesn't change more than 10%. In examples 2 and 3, the stutter is represented as a number of pixels per second squared of acceleration or deacceleration. For example, the stutter would not recognize acceleration or deacceleration unless it was above the stutter threshold of 2 pixels per second squared. In this way, the stutter threshold may include a variation in the number of pixels of acceleration that will be tolerated and interpreted as acceleration or deacceleration of the pointer. In another example, the stutter threshold could be a distance from rest, such that when the pointing device is stationary for a short period of time, a gross movement is required before the pointer will move. This would allow the user to remove their hand from the mouse or pointer to set the "rest" location and any subsequent small movement below the threshold would be ignored. One of ordinary skill in the art will recognize that other stutter thresholds could be used to smooth the acceleration based delay portion of the hover trigger delay.

FIGS. 4A-4F illustrate examples of a proximity based delay component for the dynamic hover trigger delay. The dynamic hover trigger delay may include a proximity based delay component that affects when the hover graphic will be displayed depending on the proximity of a pointer to a feature of a user interface component. In the first example in FIG. 4A, when the pointer 216 moves within the application window 212 but outside the user interface component 214 the hover trigger delay is infinite. Thus a hover graphic is never displayed until the pointer hovers over the user interface component 214.

Figure 4A:
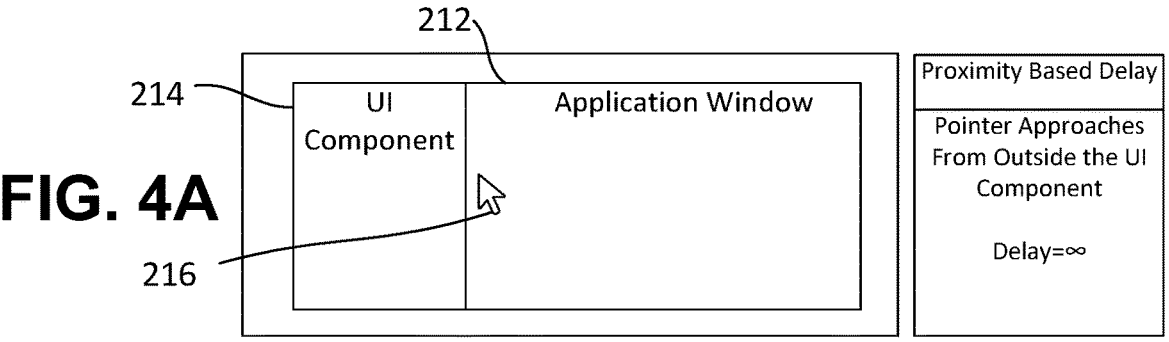
FIG. 4A illustrates an implementation a of dynamic hover trigger delay depending on the proximity of the pointer to a boundary of the user interface component.
Figure 4B:
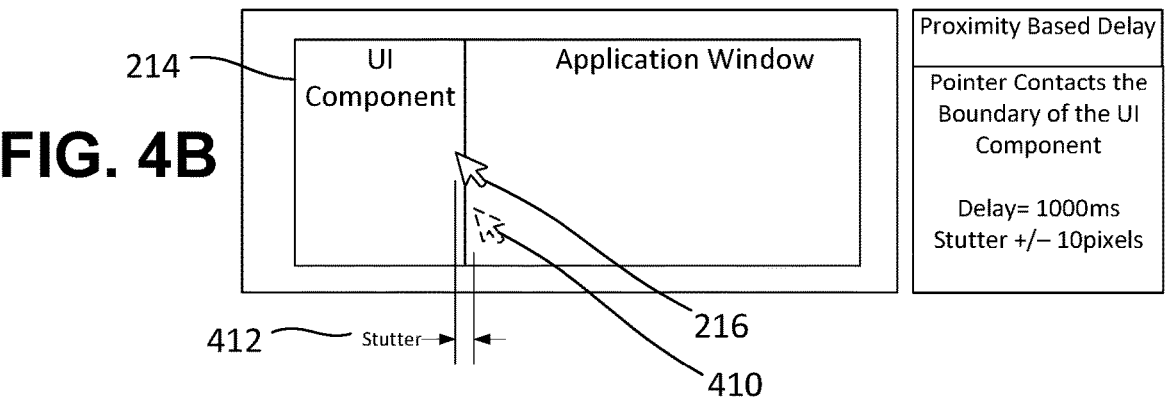
FIG. 4B illustrates another implementation a of dynamic hover trigger delay depending on the proximity of the pointer to a boundary of the user interface component.

FIG. 4B illustrates another implementation of a proximity based delay component of a dynamic hover trigger delay where the proximity based delay depends on the proximity of the pointer to a boundary of the user interface component. In this example, when the pointer 216 hovers over the user interface component 214 the delay is set to a higher initial value. This initial value may be the maximum value used for the hover trigger delay or the maximum value contributed by the proximity based delay. The time of 1000 ms is shown as an example and it is understood that other times could be used. FIG. 4B further illustrates a stutter threshold could be used to smooth the display of the hover graphic in this implementations. For this example, the stutter threshold could smooth the display of the hover graphic by allowing pointer to stutter back and forth at the user interface component boundary without resetting the hover trigger delay. As shown in FIG. 4B, the pointer 216 crosses over the boundary of the user interface component and then may move a stutter distance 412 back outside the boundary indicated by the dashed pointer 410. In this example, a stutter of plus or minus 10 pixels is allowed for movement of the pointer at the user interface boundary without changing the hover trigger delay. For example, after the pointer 216 crosses the boundary of the user interface component the hover trigger delay of 1000 ms is set. If the pointer then returns to the position 410 outside the user interface component within the stutter distance, then the hover trigger delay will be maintained as previously set.

Figure 4C:
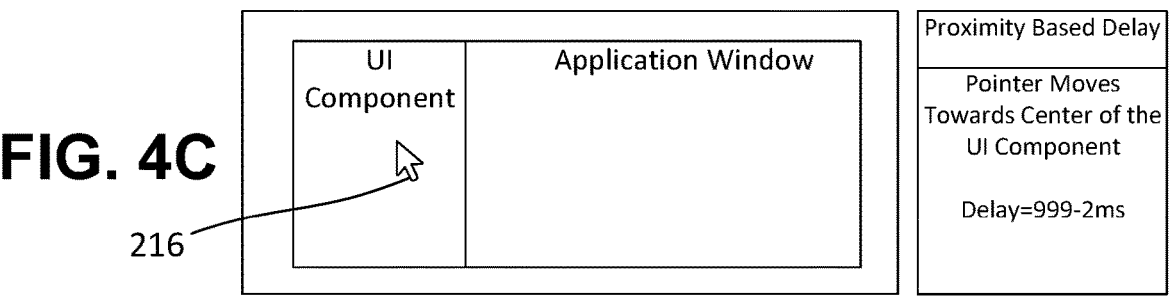
FIG. 4C illustrates another implementation a of dynamic hover trigger delay depending on the proximity of the pointer to a boundary of the user interface component.
Figure 4D:
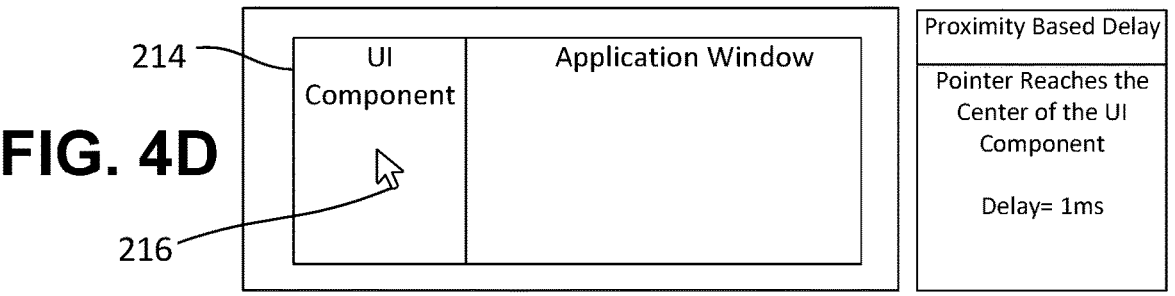
FIG. 4D illustrates another implementation of a dynamic hover trigger delay depending on the proximity of the pointer to a boundary of the user interface component.

FIG. 4C illustrates another implementation of a proximity based delay component of a dynamic hover trigger delay. In this example, the proximity based delay is decreased as the pointer moves towards the center of the user interface component. In the previous example, the proximity based delay component was set to 1000 ms as the pointer hit the boundary. As the pointer moves inside the user interface component towards the center, the proximity based delay decreases from 999 ms to 2 ms. When the pointer 216 moves to the center of the user interface component 216, the proximity based delay component is set to 1 ms as shown in FIG. 4D. The center of the user interface component may be defined as some approximation of the actual center of the user interface component.

Figure 4E:
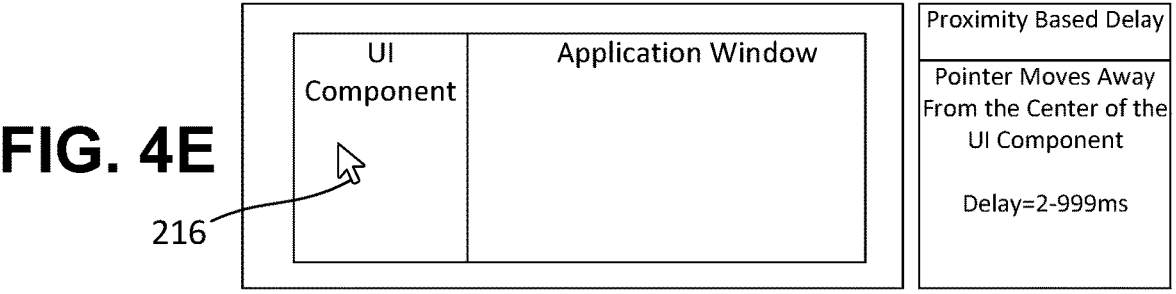
FIG. 4E illustrates another implementation of a dynamic hover trigger delay depending on the proximity of the pointer to a boundary of the user interface component.
Figure 4F:
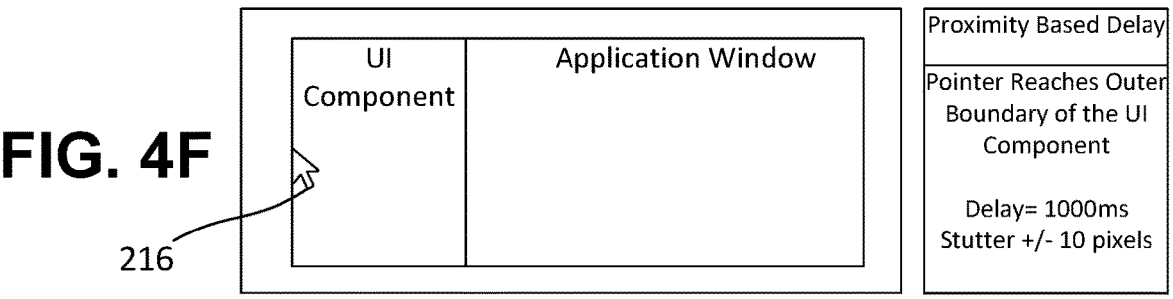
FIG. 4F illustrates another implementation of a dynamic hover trigger delay depending on the proximity of the pointer to a boundary of the user interface component.

FIG. 4E illustrates another implementation of proximity based delay component for a dynamic hover trigger delay. In this example, the proximity based delay component of the hover trigger delay is increased as the pointer moves from the center of the user interface component towards an outer edge. As the pointer moves inside the user interface component towards the outer edge, the proximity based delay increases from 2 ms to 999 ms. When the pointer 216 moves to the outer edge or boundary of the user interface component, the proximity based delay component is set to 1000 ms as shown in FIG. 4F. A stutter distance or threshold can be used as the pointer moves outside the boundary of the user interface component in a similar way as described above with reference to FIG. 4B.

Figure 4G:
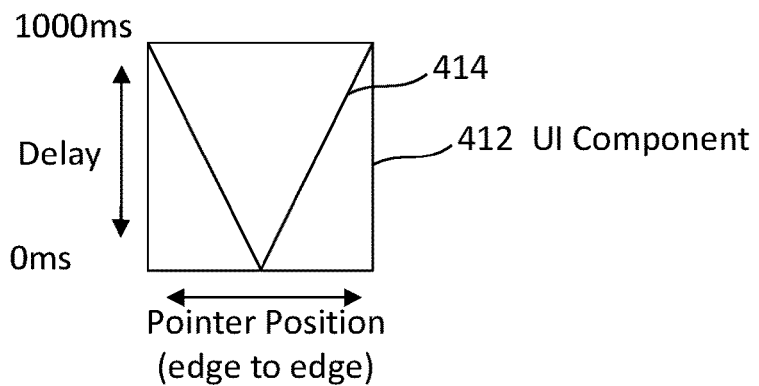
FIG. 4G illustrates a timing graph of how the dynamic trigger delay changes depending on the proximity of the pointer to a boundary of the user interface component.

FIG. 4G illustrates another implementation of a dynamic hover trigger delay depending on the proximity of the pointer to a boundary of the user interface component. FIG. 4G is a diagram representation of the proximity based delay component of the hover trigger delay depending on the pointer position as shown in FIGS. 4A-4G. The box 412 represents a user interface component 412. The hover trigger delay is shown for pointer positions from edge-to-edge in the lateral direction as the height of the trigger delay line 414. The y-axis represents the delay time and the x-axis represents the pointer position laterally or vertically through the component from one edge to the other edge. Thus, as a pointer moves from one edge to an opposite edge of the user interface component, the proximity base component of the hover trigger delay begins at 1000 ms and goes to zero ms at the center, and then rises back to 1000 ms at the opposite edge of the user interface component. Alternatively, a pre-determined minimum value may be substituted for the zero ms hover trigger delay.

As described herein, the hover trigger delay is a delay interval for displaying the hover graphic. In some implementations, the hover trigger delay may be used in conjunction with a timer to determine when to display the hover graphic. The timer can be used to track time from when the pointer 216 first comes into contact or moves into a position over the user interface component. The time reflected by the timer can be compared to the hover trigger delay for the current position of the pointer to determine when to display the hover graphic. For example, if the hover trigger delay near the edges is 10 s, and the delay at the center is 3 s. If the user moves the pointer and reaches the center within 2 seconds, the hover graphic will not be shown because the timer currently shows 2 seconds, but the delay threshold is 3 in this area. If the user continues moving the pointer and reaches the other edge within 2 additional seconds, the hover graphic will still not be shown, because the timer shows 4 seconds, but the delay threshold is now 10 in this area. If the user were to move back towards the center, it would display the hover graphic, because the timer would then exceed the 3 second threshold of the hover trigger delay near the center.

As described herein, the hover trigger display may include one or both of the acceleration based delay and the proximity based delay. When both are used, a weighting factor may be applied to one or both components of the hover trigger delay to achieve a desired balance of the two components. For example, the acceleration based delay may be given a multiplier factor of 2 to increase the influence of acceleration on the hover trigger delay compared to the proximity based delay. Shown algebraically, the hover trigger delay may be represented as: Hover trigger delay=2 (acceleration based delay)+(proximity based delay). Further, the two components may be combined in various ways to get a desired result depending on the values used for each for the delays. For example, a pointer movement that causes an acceleration based delay may be added to a current hover trigger delay that was based on one or the other components. Alternatively, an acceleration based delay could replace the current hover trigger delay previously set according to the acceleration based delay or proximity based delay.

Figure 5:
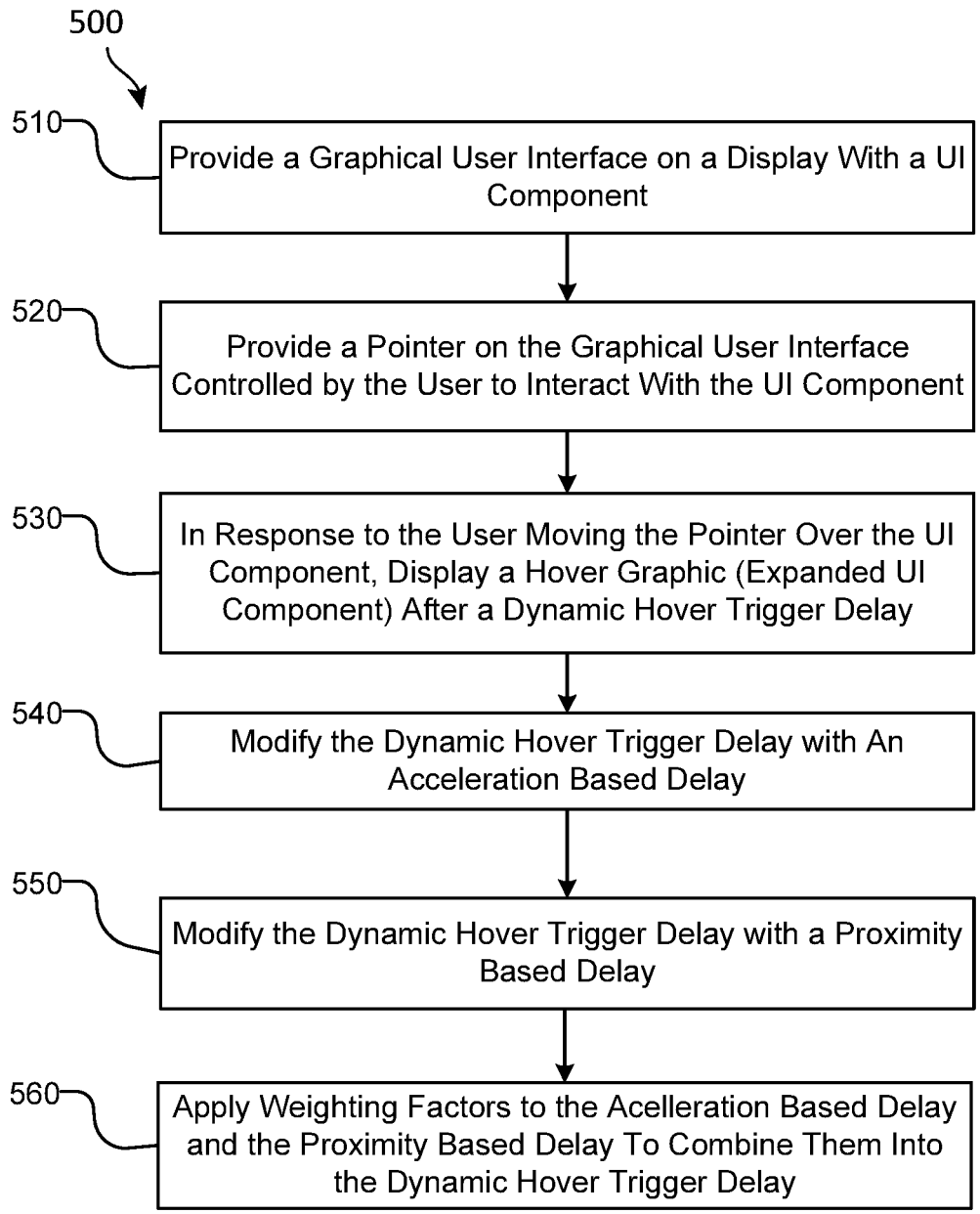
FIG. 5 is a flowchart of an implementation of a process for operating a device to provide a dynamic trigger time delay for displaying a hover graphic.

FIG. 5 is a flowchart of an implementation of a process for operating a device, such as the computer system 800, for displaying a hover graphic on a graphical user interface with a dynamic hover trigger delay. At step 510, the device provides a graphical user interface on a display with a user interface component. At step 520, the device further provides a pointer on the graphical user interface controlled by a user to interact with the graphical user interface.

At step 530, in response to the user moving the pointer over the user interface component the device displays a hover graphic (expanded user interface component) after a dynamic hover trigger delay. For example, when the pointer hovers over the user interface component an initial hover trigger delay can be set for displaying hover graphic. Subsequent movement of the pointer can be used to dynamically change the time until the hover graphic is displayed. At step 540, the device modifies the dynamic hover trigger delay with an acceleration based delay. At step 550, the device modifies the dynamic hover trigger delay with a proximity based delay. Implementations of the device may include any combination of acceleration based delay and proximity based delay. For example, an implementation may include step 540 but not step 550, step 550 but not step 540, or may include both steps 540 and 550. Further, these two steps may be carried out simultaneously in implementations where both steps are used.

At step 560, the device may apply weighting factors to the acceleration based delay and the proximity based delay to combine them into the dynamic hover trigger delay. For example, the hover trigger display may include one or both of the acceleration based delay and the proximity based delay. When both are used, a weighting factor may be applied to one or both components of the hover trigger delay to achieve a desired balance of the two components. Further, the two components may be combined by adding a factor based on one or the other components to the current delay or by replacing the current hover trigger delay according to the acceleration based delay or proximity based delay.

Figure 6:
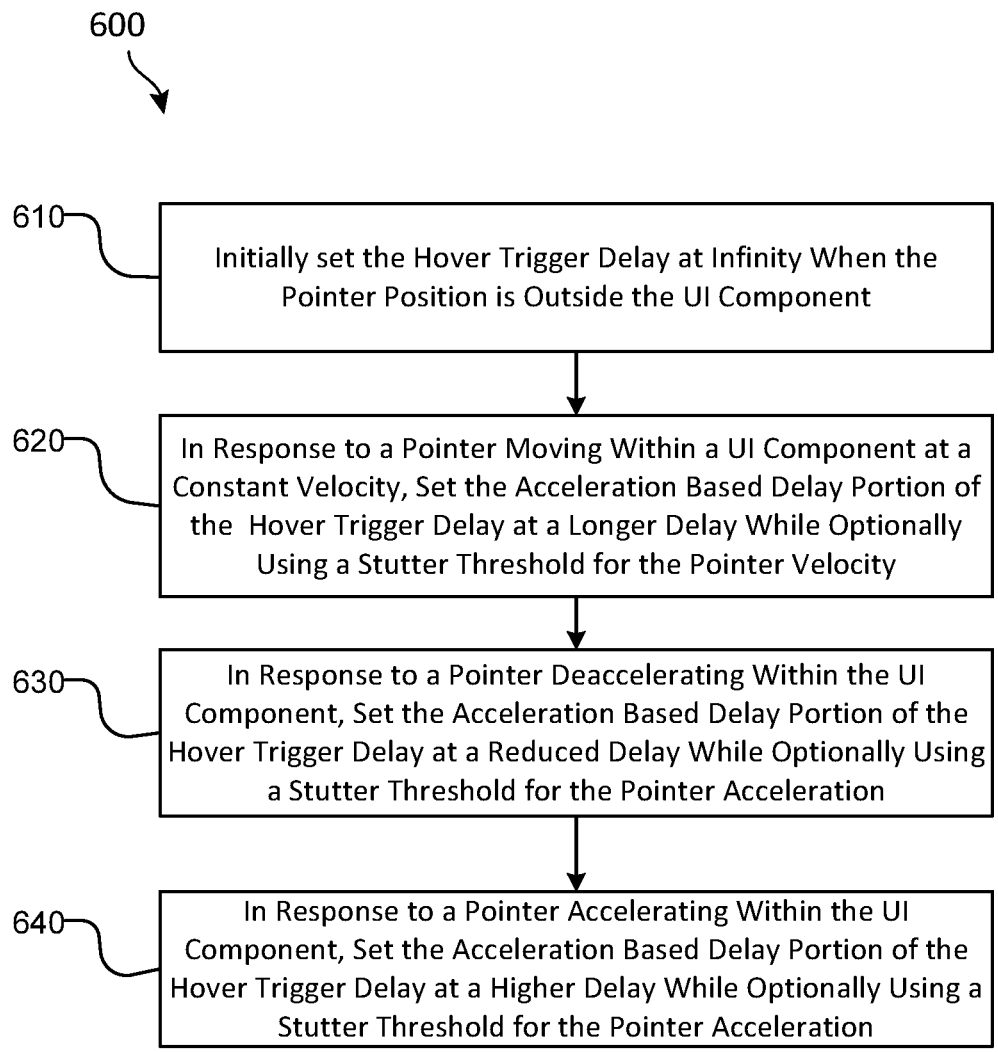
FIG. 6 is a flowchart of an implementation of a process for operating a device to display a hover graphic on a graphical user interface with a dynamic hover trigger delay having an acceleration based delay.

FIG. 6 is a flowchart of an implementation of a process for operating a device, such as the computer system 800, for displaying a hover graphic on a graphical user interface with a dynamic delay having an acceleration based delay. FIG. 6 gives one possible implementation of step 540 in FIG. 5. In step 610, the device initially begins with the hover trigger delay at infinity when the pointer location is outside the UI component. At step 620, the device sets an acceleration based portion of the hover trigger delay at a longer or maximum delay in response to a pointer moving within a user interface component at substantially a constant velocity. At step 620, the device may use a stutter threshold for the pointer velocity to smooth the hover trigger delay. For example, the stutter threshold may include a threshold of 10% where the velocity of the pointer is considered constant within a 10% threshold.

At step 630, the device sets the acceleration based delay portion of the hover trigger delay at a reduced or minimum value in response to the pointer deaccelerating within the user interface component. For example, the device may set the acceleration based delay portion at 1 ms. At step 640, the device sets the acceleration based delay portion of the hover trigger delay at a higher or maximum value in response to the pointer accelerating within the user interface component. At steps 630 and 640, the device may use a stutter threshold for the pointer acceleration to smooth the response of the hover trigger delay to small changes in the acceleration. For example, the stutter threshold may include a variation in the number of pixels per second squared that will be tolerated and interpreted as acceleration or deacceleration of the pointer.

Figure 7:
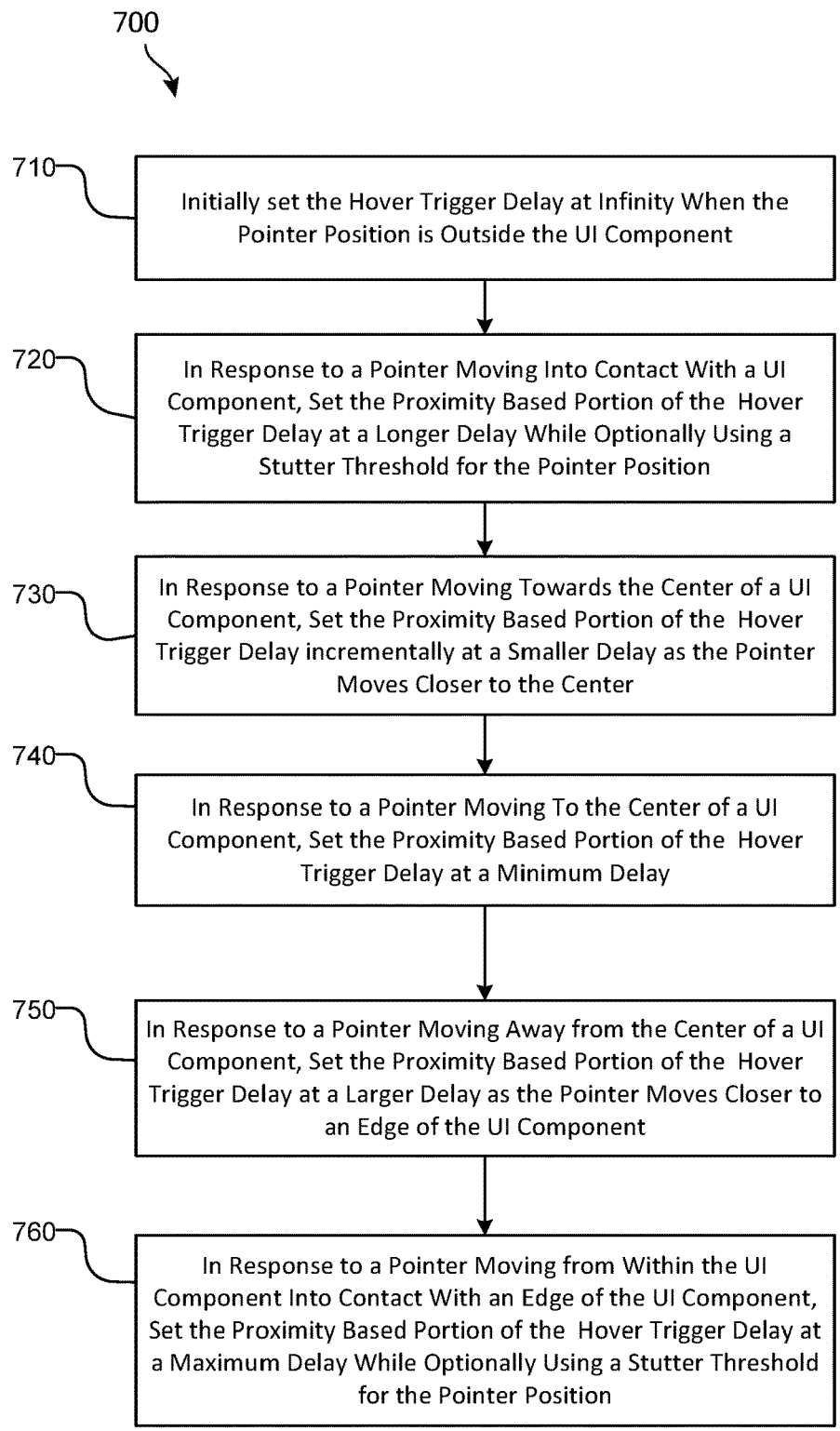
FIG. 7 is a flowchart of another implementation of a process for operating a device for displaying a hover graphic on a graphical user interface with a dynamic hover trigger delay having a proximity based delay.

FIG. 7 is a flowchart of an implementation of a process for operating a device, such as the computer system 800, for displaying a hover graphic on a graphical user interface with a dynamic hover trigger delay having a proximity based delay component. FIG. 7 gives one possible implementation of step 550 in FIG. 5. In step 710, the device initially begins with the hover trigger delay at infinity when the pointer location is outside the UI component. At step 720, the device may set the proximity based portion of the hover trigger delay at a longer delay in response to a pointer moving over a user interface component. For example, the device may set the hover trigger delay to a maximum value such as 1000 ms. Optionally, the device in step 720 may use a stutter threshold to smooth the pointer position to prevent the hover trigger delay from being set back to infinity.

At step 730, the device may in response to the pointer moving towards the center of the user interface component set the proximity based portion of the hover trigger delay at a smaller delay incrementally as the pointer moves closer towards the center. For example, the device may set the hover trigger delay to a maximum value such as 999 ms just inside the user interface component and then incrementally adjust the value down to 2 ms as the pointer moves towards the center. At step 740, the device may set the proximity based portion of the hover trigger delay at a predetermined minimum value or zero when the pointer reaches the center or the approximate center of the user interface component.

At step 750, the device may in response to the pointer moving away from the center of the user interface component set the proximity based portion of the hover trigger delay at a smaller delay incrementally as the pointer moves closer towards the edge of the UI component. For example, the device may set the hover trigger delay to a minimum value such as 2 ms near the center of the user interface component and then incrementally adjust the value up to 999 ms as the pointer moves from near the center towards the edge.

At step 760, the device may set the proximity based portion of the hover trigger delay at a longer delay in response to a pointer hovering over or moving into a position over a user interface component. For example, the device may set the hover trigger delay to a maximum value such as 1000 ms. Optionally, the device in step 760 may use a stutter threshold to smooth the pointer position to prevent the hover trigger delay from being set back to infinity when the pointer is outside the user interface component but within the stutter threshold.

Figure 8:
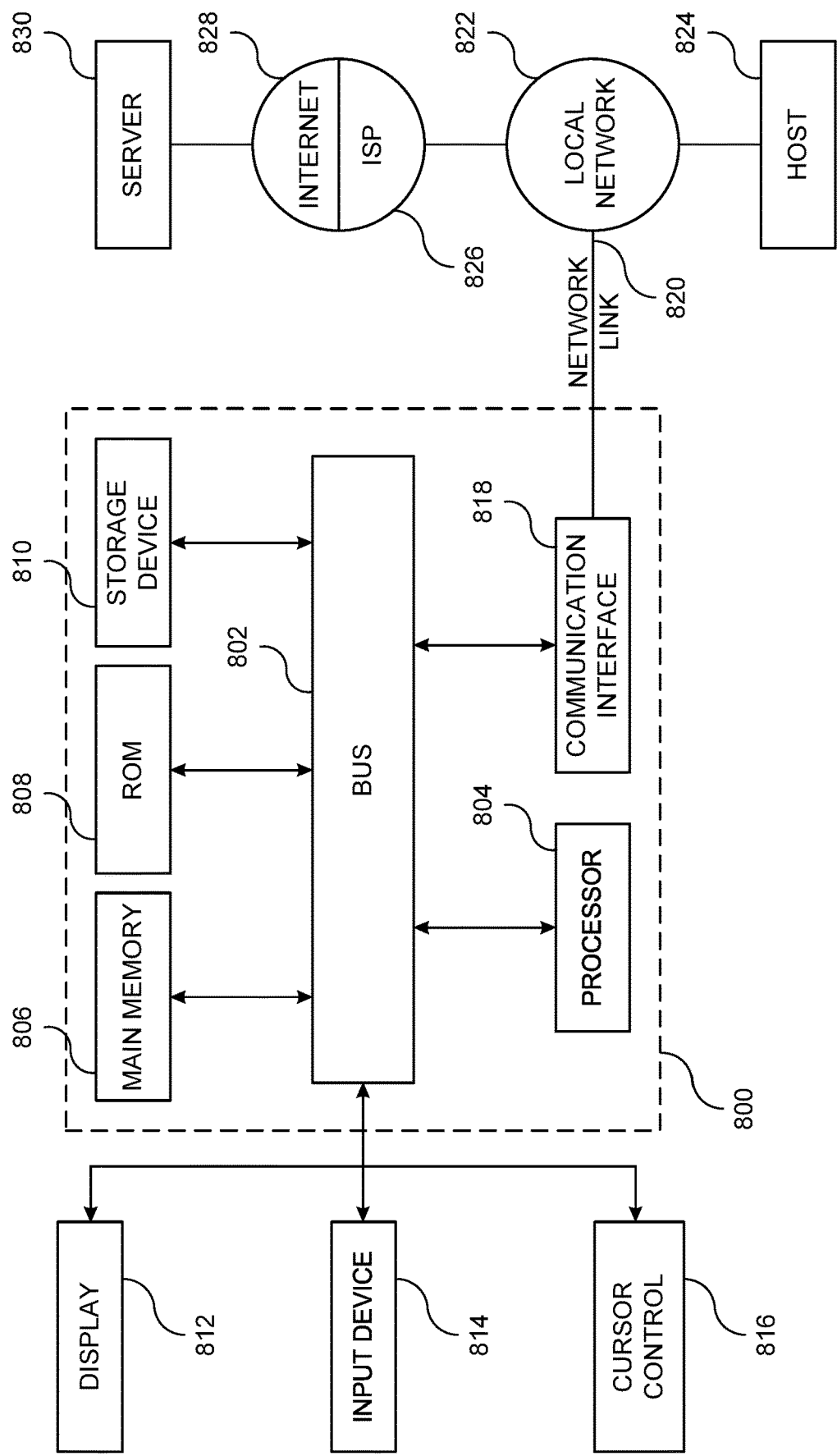
FIG. 8 is a block diagram showing an example computer system upon which various implementations of this disclosure may be implemented.

FIG. 8 is a block diagram showing an example a computer system 800 upon which various implementations of this disclosure may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804.

The computer system 800 may further include a read only memory (ROM) 808 or other static storage device coupled to the bus 802 for storing static information and instructions for the processor 804. A storage device 810, such as a flash or other non-volatile memory may be coupled to the bus 702 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include physical structure, or virtual implementation, or both, providing user input modes or options, for controlling, for example, a cursor, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program or an internet web page.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
   a processor; and
   a memory in communication with the processor, the memory comprising executable instructions that, when executed by the processor, cause the processor to control the device to perform functions of:
   providing a graphical user interface for a user on a display;
   displaying a user interface component on the graphical user interface;
   providing a pointer on the graphical user interface controlled by the user to interact with the user interface component on the graphical user interface;
   in response to the pointer being positioned over the displayed user interface component, displaying after a dynamic hover trigger delay a hover graphic proximate to the component wherein the dynamic hover trigger delay dynamically changes depending on movement of the pointer by the user;
   wherein the dynamic hover trigger delay includes a proximity based delay component, wherein the proximity based delay component is set to a first value when the pointer first hovers over the user interface component; and
   wherein the dynamic hover trigger delay includes a stutter threshold in conjunction with the proximity based delay component, and the stutter threshold includes a predetermined number of pixels allowed for movement of the pointer at a boundary of the user interface component.

2. The device of claim 1, wherein the dynamic hover trigger delay includes an acceleration based delay, wherein the acceleration based delay provides decreasing the dynamic hover trigger delay when the pointer is deaccelerating over the component.

3. The device of claim 2, wherein the acceleration based delay further provides increasing the dynamic hover trigger delay when the pointer is accelerating over the component.

4. The device of claim 2, wherein the acceleration based delay further provides maintaining an initial hover trigger delay when the pointer is moving at a substantially constant velocity over the component.

5. The device of claim 2, wherein the dynamic hover trigger delay includes the stutter threshold in conjunction with the acceleration based delay.

6. The device of claim 1, wherein the proximity based delay component of the hover trigger delay is set to a lower value as the pointer moves towards the center of the user interface component.

7. The device of claim 1, wherein the proximity based delay component of the hover trigger delay is set to a higher value as the pointer moves from the center of the user interface component towards an edge of the user interface component.

8. The device of claim 1, wherein the proximity based delay component of the hover trigger delay is set to a predetermined minimum value as the pointer moves over the center of the user interface component.

9. A method of operating a device, comprising:
   providing a graphical user interface for a user on a display;
   displaying a user interface component on the graphical user interface;

providing a pointer on the graphical user interface controlled by the user to interact with the user interface component on the graphical user interface; and in response to the pointer being in proximity to the displayed user interface component, displaying, after a dynamic hover trigger delay, a hover graphic proximate to the component wherein the dynamic hover trigger delay dynamically changes depending on movement of the pointer by the user wherein the dynamic hover trigger delay includes a proximity based delay component, wherein the proximity based delay component is set to a first value when the pointer first hovers over the user interface component; and wherein the dynamic hover trigger delay includes a stutter threshold in conjunction with the proximity based delay and the stutter threshold includes a predetermined number of pixels allowed for movement of the pointer at a boundary of the user interface component.

10. The method of claim 9, wherein the dynamic hover trigger delay includes an acceleration based delay wherein the acceleration based delay provides decreasing the dynamic hover trigger delay when the pointer is de-accelerating over the component.

11. The method of claim 10, wherein the acceleration based delay further provides increasing the dynamic hover trigger delay when the pointer is accelerating over the component and maintaining an initial hover trigger delay when the pointer is moving at a substantially constant velocity over the component.

12. The method of claim 11, wherein the proximity based delay component of the hover trigger delay is set to a lower value as the pointer moves towards the center of the user interface component.

13. The method of claim 11, wherein the proximity based delay component of the hover trigger delay is set to a higher value as the pointer moves from the center of the user interface component towards an edge of the user interface component.

14. The method of claim 11, wherein the proximity based delay component of the hover trigger delay is set to a predetermined minimum value as the pointer moves over the center of the user interface component.

15. A non-transitory computer readable medium on which are stored instructions that, when executed by a computer processor, cause a device to:

provide a graphical user interface for a user on a display;

display a user interface component on the graphical user interface;

provide a pointer on the graphical user interface controlled by the user to interact with the user interface component on the graphical user interface; and in response to the pointer being in proximity to the displayed user interface component, display after a dynamic hover trigger delay a hover graphic proximate to the component wherein the dynamic hover trigger delay dynamically changes depending on movement of the pointer by the user;

wherein the dynamic hover trigger delay includes a proximity based delay component, wherein the proximity based delay component is set to a first value when the pointer first hovers over the user interface component; and wherein the dynamic hover trigger delay includes a stutter threshold in conjunction with the proximity based delay and the stutter threshold includes a predetermined number of pixels allowed for movement of the pointer at a boundary of the user interface component.

16. The non-transitory computer readable medium of claim 15, wherein the instructions further cause the device to:

wherein the dynamic hover trigger delay includes an acceleration based delay wherein the acceleration based delay provides decreasing the dynamic hover trigger delay when the pointer is deaccelerating over the component and increasing the dynamic hover trigger delay when the pointer is accelerating over the component.

\* \* \* \* \*